United States Patent
Thibault

(10) Patent No.: US 6,473,660 B1
(45) Date of Patent: Oct. 29, 2002

(54) PROCESS CONTROL SYSTEM AND METHOD WITH AUTOMATIC FAULT AVOIDANCE

(75) Inventor: Richard L. Thibault, Plainville, MA (US)

(73) Assignee: The Foxboro Company, Foxboro, MA (US)

(*) Notice: Subject to any disclaimer, the term of this patent is extended or adjusted under 35 U.S.C. 154(b) by 0 days.

(21) Appl. No.: 09/454,053

(22) Filed: Dec. 3, 1999

(51) Int. Cl.[7] ............................................... G05B 15/00
(52) U.S. Cl. ............................ 700/79; 700/20; 700/21; 714/37
(58) Field of Search ........................... 700/79, 2–3, 82, 700/83, 19–20, 21; 709/210, 211; 714/2, 6, 11, 37

(56) References Cited

U.S. PATENT DOCUMENTS

| | | |
|---|---|---|
| 3,810,119 A | 5/1974 | Zieve et al. |
| 3,825,905 A | 7/1974 | Allen, Jr. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,410,942 A | 10/1983 | Milligan et al. |
| 4,423,486 A | 12/1983 | Berner |
| 4,428,044 A | 1/1984 | Liron |
| 4,435,762 A | 3/1984 | Milligan et al. |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,609,995 A | 9/1986 | Hasebe |
| 4,615,001 A | 9/1986 | Hudgins, Jr. |
| 4,628,437 A | 12/1986 | Poschmann et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,304 A | 7/1987 | Tierney |

(List continued on next page.)

FOREIGN PATENT DOCUMENTS

| | | |
|---|---|---|
| WO | WO 96/12993 | 2/1996 |
| WO | WO 96/31047 | 3/1996 |
| WO | WO 96/12993 | * 5/1996 |
| WO | WO 96/23377 | 8/1996 |
| WO | WO 97/07486 | 2/1997 |
| WO | WO 98/20649 | 5/1998 |
| WO | WO 98/36518 | 8/1998 |
| WO | WO 98/54843 | 12/1998 |

OTHER PUBLICATIONS

"Agenda," ISA/SP50—1988–180, ISA Draft.
Capetta, L., et al. "From Current Actuators and Transmitters Towards Intelligent Actuation and Measurement: PRIAM Approach," BIAS 93.

(List continued on next page.)

Primary Examiner—Thomas Black
Assistant Examiner—Ronald D Hartman, Jr.
(74) Attorney, Agent, or Firm—David J. Powsner; Nutter McClellen & Fish LLP

(57) ABSTRACT

A control system incorporates components that automatically switch information sources in response to actual or potential degradation of information generated by them. Thus, a control system has first and second control components that generate first and second "source" signals, respectively, representing substantially identical or related process control variables. A third control component, which normally processes the first source signal, responds to actual or potential degradation of that signal for processing the second source signal in lieu of the first.

115 Claims, 3 Drawing Sheets

U.S. PATENT DOCUMENTS

| | | |
|---|---|---|
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,742,349 A | 5/1988 | Miesterfeld et al. |
| 4,750,109 A | 6/1988 | Kita |
| 4,790,762 A | 12/1988 | Harms et al. |
| 4,805,107 A | 2/1989 | Kieckhafer et al. |
| 4,816,996 A | 3/1989 | Hill et al. |
| 4,817,094 A | 3/1989 | Lebizay et al. |
| 4,872,106 A | 10/1989 | Slater |
| 4,897,777 A | 1/1990 | Janke et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,122,948 A | 6/1992 | Zapolin |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,146,589 A | 9/1992 | Peet, Jr. et al. |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,166,685 A | 11/1992 | Campbell, Jr. et al. |
| 5,168,276 A | 12/1992 | Huston et al. |
| 5,175,829 A | 12/1992 | Stumpf et al. |
| 5,193,175 A | 3/1993 | Cutts, Jr. et al. |
| 5,212,784 A | 5/1993 | Sparks |
| 5,233,615 A | 8/1993 | Goetz |
| 5,245,704 A | 9/1993 | Weber et al. |
| 5,255,367 A | 10/1993 | Bruckert et al. |
| 5,258,999 A | 11/1993 | Wernimont et al. |
| 5,271,013 A | 12/1993 | Gleeson |
| 5,283,729 A | 2/1994 | Lloyd |
| 5,289,365 A | 2/1994 | Caldwell et al. |
| 5,295,258 A | 3/1994 | Jewett et al. |
| 5,297,143 A | 3/1994 | Fridrich et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,372 A | 4/1994 | Sawyer et al. |
| 5,307,463 A | 4/1994 | Hyatt et al. |
| 5,317,726 A | 5/1994 | Horst |
| 5,335,221 A | 8/1994 | Snowbarger et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,381,529 A | 1/1995 | Matsushima |
| 5,390,321 A | 2/1995 | Proesel |
| 5,398,331 A | 3/1995 | Huang et al. |
| 5,400,140 A | 3/1995 | Johnston |
| 5,410,717 A | 4/1995 | Floro |
| 5,428,769 A | 6/1995 | Glaser et al. ............... 395/575 |
| 5,428,781 A | 6/1995 | Duault et al. |
| 5,434,997 A | 7/1995 | Laundry et al. |
| 5,444,851 A | 8/1995 | Woest |
| 5,450,403 A | 9/1995 | Ichii et al. |
| 5,450,425 A | 9/1995 | Gunn et al. |
| 5,450,764 A | 9/1995 | Johnston |
| 5,451,939 A | 9/1995 | Price |
| 5,457,797 A | 10/1995 | Butterworth et al. |
| 5,459,839 A | 10/1995 | Swarts et al. |
| 5,463,735 A | 10/1995 | Pascucci et al. |
| 5,469,570 A | 11/1995 | Shibata |
| 5,475,856 A | 12/1995 | Kogge |
| 5,481,741 A | 1/1996 | McKaskle et al. |
| 5,483,660 A | 1/1996 | Yishay et al. |
| 5,485,620 A | 1/1996 | Sadre et al. |
| 5,490,276 A | 2/1996 | Doli, Jr. et al. |
| 5,491,625 A | 2/1996 | Pressnall et al. ............ 364/133 |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,655 A | 5/1996 | Collins et al. |
| 5,519,701 A | 5/1996 | Colmant et al. |
| 5,522,044 A | 5/1996 | Pascucci et al. |
| 5,530,643 A | 6/1996 | Hodorowski |
| 5,539,909 A | 7/1996 | Tanaka et al. |
| 5,544,008 A | 8/1996 | Dimmick et al. |
| 5,550,980 A | 8/1996 | Pascucci et al. |
| 5,551,047 A | 8/1996 | Mori et al. |
| 5,555,213 A | 9/1996 | DeLong |
| 5,555,437 A | 9/1996 | Packer |
| 5,555,510 A | 9/1996 | Verseput et al. |
| 5,559,963 A | 9/1996 | Gregg et al. |
| 5,568,378 A | 10/1996 | Wojsznis |
| 5,570,300 A | 10/1996 | Henry et al. ........... 364/551.01 |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,112 A | 12/1996 | Tabata |
| 5,586,156 A | 12/1996 | Gaubatz ..................... 376/216 |
| 5,586,329 A | 12/1996 | Knudsen et al. |
| 5,586,330 A | 12/1996 | Knudsen et al. |
| 5,587,899 A | 12/1996 | Ho et al. |
| 5,594,899 A | 1/1997 | Knudsen et al. |
| 5,596,331 A | 1/1997 | Bonaffini et al. |
| 5,596,752 A | 1/1997 | Knudsen et al. |
| 5,598,536 A | 1/1997 | Slaughter, III et al. |
| 5,600,845 A | 2/1997 | Gilson |
| 5,604,871 A | 2/1997 | Pecone |
| 5,611,057 A | 3/1997 | Pecone et al. |
| 5,613,148 A | 3/1997 | Bezviner et al. |
| 5,617,540 A | 4/1997 | Civanlar et al. |
| 5,627,979 A | 5/1997 | Chang et al. |
| 5,629,949 A | 5/1997 | Zook |
| 5,630,056 A | 5/1997 | Horvath et al. |
| 5,630,152 A | 5/1997 | DeLuca et al. |
| 5,642,511 A | 6/1997 | Chow et al. |
| 5,649,121 A | 7/1997 | Budman et al. |
| 5,655,092 A | 8/1997 | Ojala |
| 5,659,680 A | 8/1997 | Cunningham et al. |
| 5,664,101 A | 9/1997 | Picache |
| 5,664,168 A | 9/1997 | Yishay et al. |
| 5,671,374 A | 9/1997 | Postman et al. |
| 5,676,141 A | 10/1997 | Hollub |
| 5,680,404 A | 10/1997 | Gray |
| 5,680,409 A | 10/1997 | Qin et al. |

| | | |
|---|---|---|
| 5,682,476 A | 10/1997 | Tapperson et al. |
| 5,687,316 A | 11/1997 | Graziano et al. |
| 5,701,414 A | 12/1997 | Cheng et al. |
| 5,708,779 A | 1/1998 | Graziano et al. |
| 5,715,178 A | 2/1998 | Scarola et al. ............. 364/551 |
| 5,719,761 A | 2/1998 | Gatti et al. |
| 5,726,912 A | 3/1998 | Krall, Jr. et al. |
| 5,727,128 A | 3/1998 | Morrison |
| 5,732,218 A | 3/1998 | Bland et al. |
| 5,737,529 A | 4/1998 | Dolin, Jr. et al. |
| 5,742,762 A | 4/1998 | Scholl et al. |
| 5,748,467 A | 5/1998 | Qin et al. |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,772 A | 5/1998 | Leaf |
| 5,758,073 A | 5/1998 | Liang et al. |
| 5,758,075 A | 5/1998 | Graziano et al. |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,378 A | 6/1998 | Yang ..................... 364/571.02 |
| 5,774,670 A | 6/1998 | Montulli |
| 5,777,874 A | 7/1998 | Flood et al. |
| 5,787,272 A | 7/1998 | Gupta et al. |
| 5,790,791 A | 8/1998 | Chong et al. |
| 5,793,963 A | 8/1998 | Tapperson et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,805,442 A | 9/1998 | Crater et al. |
| 5,805,922 A | 9/1998 | Sim et al. |
| 5,822,220 A | 10/1998 | Baines |
| 5,828,851 A | 10/1998 | Nixon et al. |
| 5,831,669 A | 11/1998 | Adrain |
| 5,832,418 A | 11/1998 | Meyer |
| 5,838,920 A | 11/1998 | Rosborough |
| 5,841,360 A | 11/1998 | Binder |
| 5,841,963 A | 11/1998 | Nakamikawa et al. |
| 5,844,601 A | 12/1998 | McPheely et al. |
| 5,847,957 A | 12/1998 | Cohen et al. |
| 5,854,944 A | 12/1998 | Catherwood et al. |
| 5,862,052 A | 1/1999 | Nixon et al. |
| 5,864,773 A | 1/1999 | Barna et al. ................... 702/85 |
| 5,867,704 A | 2/1999 | Tanaka |
| 5,872,992 A | 2/1999 | Tietjen et al. |
| 5,873,089 A | 2/1999 | Regache |
| 5,874,990 A | 2/1999 | Kato |
| 5,880,775 A | 3/1999 | Ross |
| 5,909,586 A | 6/1999 | Anderson |
| 5,930,768 A | 7/1999 | Hooban |
| 5,938,775 A | 8/1999 | Damani et al. |
| 5,956,487 A | 9/1999 | Venkatraman et al. |
| 5,975,737 A | 11/1999 | Crater et al. |
| 5,980,078 A | 11/1999 | Krivoshein et al. |
| 5,980,090 A | 11/1999 | Royal, Jr. et al. |
| 5,982,362 A | 11/1999 | Crater et al. |
| 5,994,998 A | 11/1999 | Fisher et al. |
| 6,014,591 A | 1/2000 | Ikeda |
| 6,014,612 A | 1/2000 | Larson et al. |
| 6,026,352 A | 2/2000 | Burns et al. |
| 6,035,264 A | 3/2000 | Donaldson et al. |
| 6,047,222 A * | 4/2000 | Burns et al. ................... 700/79 |
| 6,049,578 A | 4/2000 | Senechal et al. ............ 376/215 |
| 6,049,775 A | 4/2000 | Gertner et al. |
| 6,055,633 A | 4/2000 | Schrier et al. |
| 6,070,250 A | 5/2000 | Yeager et al. ................. 714/11 |
| 6,078,320 A | 6/2000 | Dove et al. |
| 6,094,600 A | 7/2000 | Sharpe, Jr. et al. |
| 6,061,603 A | 9/2000 | Papadopoulos et al. |
| 6,115,468 A | 9/2000 | De Nicolo |
| 6,139,177 A | 10/2000 | Venkatraman et al. |
| 6,140,911 A | 10/2000 | Fisher et al. |
| 6,151,625 A | 11/2000 | Swales et al. |
| 6,176,421 B1 | 1/2001 | Royal, Jr. et al. |
| 6,201,996 B1 | 3/2001 | Crater et al. |
| 6,218,930 B1 | 4/2001 | Katzenberg et al. |
| 6,298,454 B1 * | 10/2001 | Schleiss et al. ............... 714/37 |
| 6,356,857 B1 * | 3/2002 | Qin et al. ................... 702/185 |

OTHER PUBLICATIONS

Editing Committee Draft Application Layer, Version 8, May 1991.

Editing Committee Draft Application Layer, Version 12, Oct. 1991.

Esprit Project 6188, "PRIAM Dictionary: Major Terms and Definitions Used in the PRIAM Project," Prenormative Requirements for Intelligent Actuation and Measurement, May 1995.

Fieldbus Standard for Use in Industrial Control Systems. Part 2: Physical Layer Specification and Service Definition. (1992) ANSI/ISA–S50.02.

Furness, Harry. "Fieldbus: The Differences Start From the Bottom Up," *Control Engineering* (Mar. 1994), pp. 75–77.

Holding, David and Wood, Graham. "Communications in microprocessor industrial implementation," *Microprocessors and Microsystems* vol. 3 No. 10 (Dec. 1979), pp. 443–451.

Johnson, Dick. "Pressure Sensing Advances: Are They in Your Process' Future?" *Control Engineering* (Apr. 1995), pp. 67–72.

Lenhart, Gerald W. "Fieldbus–Based Local Control Networks," *INTECH* (Aug. 1994), pp. 31–34.

Meeting Minutes, SP50, International Electrotechnical Commission, Technical Committee No. 65: Industrial–Process Measurement and Control, Sub–Committee 65C: Digital Data Communications for Measurement and Control and Working Group 6: Field Bus Standard for Use in Industrial Control Systems, Feb. 28–Mar. 4, 1988, Scottsdale, AZ.

Meeting Minutes, Windows Working Group of Application Subcommittee, Mar. 1–3, 1989, New Orleans, LA.

Meeting Minutes, Ad Hoc Function Block Meeting, Jun. 14, 1990 Chapel Hill, NC.

Meeting Minutes, Process Control Working Group of SP50. 4, Jan. 21–23, 1991, Atlanta, GA.

Mirabella, Orazio. "A Short Presentation of IEC Fieldbus Application Layer," Informatics and Communication Institute, Engineering Faculty, University of Catania, Italy.

"NCR Fieldbus Slave Controller Advance Information," ISA–SP50–1988–161, ISA Draft.

NOAH: Network Oriented Application Harmonisation based on General Purpose Field Communication System. Project description rev. 1.0, Oct. 25, 1995, P–NET, PROFIBUS, WorldFIP.

Nobuhiko, Tsuji, et al. "An Advanced Optical Fieldbus Instrumentation System Using 16 x 16 Reflection Type Optical Star Coupler and Low Powered Transmitter," pp. 755–764.

Output to Valve, Revision No. 1.4, Jan. 18, 1991, (Draft Document), Instrument Society of America.

Owen, S., et al. "A modular reconfigurable approach to the creation of flexible manufacturing cells for educational purposes," *Fast Reconfiguration of Robotic and Automation Resources* (Colloquium) Oct. 20, 1995, The Institution of Electrical Engineers, Digest No. 95/174.

Pace, Hugh W. "Valve Actuators Ready for Fieldbus," *Control Engineer* (Oct. 1995), pp. 65–73.

Pfeifer T. and Fussel B. "Sensorbetriebssystem fur messtechnische Problemstellungen in der Produktionstechnik," *Technisches Messen* vol. 58 (1991) Nos. 7/8.

Phinney, Thomas L. "An Analysis of Contending Proposals in ISA SP–50 for an ISA/IEC Field Instrument Bus," ISA (1988) Paper #88–1489.

Product Specification, I/A Series® RBATCH II.

PROWAY–LAN Industrial Data Highway. (Approved Feb. 3, 1986) ISA–S72.01–1985.

"Radio Field Bus," ISA/SP50—1988–184, ISA Draft.

Report from IEC SC65 Working Group 6 Function Block, May 1, 1995.

Schuur, C. "Comments on 'Analysis and Suggestions for ISA–SP50' as submitted to the SP50 Committee by Honeywell Inc." (Mar. 11, 1988) ISA–SP50–1988–155, ISA Draft.

Schuur, Chris and Warrior, Jay. "Philips Token Passing Field Bus Controller Timed Token Mode," ISA/SP50—1988–186, ISA Draft.

"SDRD Using 1553B Data Link Services," ISA/SP50–1988–243 (1988).

Skabowski, E. L. "Recommendations for Consideration at Oct., 1988 Application Layer Subcommittee Meeting," (Oct. 3, 1986).

Strothman, Jim and Ham, John, "Alliances, Fieldbus, Windows Stir ISA/94 Anaheim Pot," *INTECH* (Dec. 1994), pp. 32–35.

Strothman, Jim and Ham, John. "ISA/95 New Orleans: 'Open', NT winds (not Opal) blow strong," *INTECH* (Nov. 1995), pp. 45–48.

Table of Contents, Automation & Technology Department, 1995.

Table of Contents, Automation & Technology Department, 1993.

Table of Contents, Industrial Computing Society (no date).

Table of Contents, Proceedings of the Industrial Computing Conference, vol. 3, Sep. 19–24, 1993, Chicago, IL. Industrial Computing Society.

[Table of Contents], Proceedings of the 20th International Conference on Industrial Electronics Control and Instrumentation, vols. 1–3, Sep. 5–9, 1994, Bologna, Italy.

[Table of Contents], Proceedings of the 7th Mediterranean Electrotechnical Conference, vol. 1, Apr. 12–14, 1994, Antalya, Turkey.

Table of Contents, ISA/88, Houston, MA, (no date).

Table of Contents, ISA/89, (no date).

Tobin, David. "Southeast Paper Installs Largest Foxboro Distributed Control System."

"User Layer Structure," SP–50 Technical Report (Jul. 25, 1990).

"User Layer Technical Report," ISA/SP50—1990–389C, ISA Draft.

Weinert, A., et al. "RT/OS—realtime programming and application environment for the COSY control system," *Nuclear Instruments and Methods in Physics Research A* vol. 352 (1994), pp. 277–279.

WG1 List of Criteria (Appendix 1), (Oct. 21, 1988) ISA/SP50–1988–242, ISA Draft.

Wood, G. G. "The Argus CONSUL System for On–Line Computer Control," *Electrical Engineering Transactions* (Mar. 1969), pp. 114–118.

Wood, G. G. "Current Fieldbus activities," *computer communications* vol. 11 (Jun. 1988) No. 3, pp. 118–123.

Wood, Graeme G. "Data Transmission, Processing and Presentation," pp. 46–54.

Wood, G. G. "Evolution of communication standards for the process industry," *Measurement+ Control* vol. 19 (Jul./Aug. 1986), pp. 183–188.

Wood, Graeme. Fieldbus Status 1995, *Computing & Control Engineering Journal* (Dec. 1995), pp. 251–253.

Wood, Graeme, G. "Standardisation Work for Communication Among Distributed Industrial Computer Control Systems—A Status Report," INRIA (1984), pp. 67–69.

Wood, G. G. "Towards digital information control," *Measurement+ Control* vol. 21 (Jul./Aug. 1988), pp. 179–180.

Stapleton, N. "802.3 Working Group DTE Power via MDI Call for interest," 3Com Jul. 1999.

Berge, Jonas. "Using Ethernet is a no–brainer," *In Tech: The International Journal for Measurement and Control* Jul. 2000, pp. 36–39.

"Tour an actual TribeLink via WebManage," web page print–out from http://www.tribe.com/products/webmanage/quick$_{13}$ view.htm. (1 page).

"Tribe Launches Innovative Remote Management Solution; New WebManage Technology Provides Network Management Via the World Wide Web," web page print–out (Jul. 12, 1999) from http://www.tribe.com/products/webmanage/wm_pr. (1 page).

"TribeRoute," web page print–out (Jul. 12, 1999) from http://www.tribe.com/products/tr/index. (3 pages).

"TribeStar," web page print–out from http://www.tribe.com/products/tribestar/index.htm (3 pages).

"CMU SCS Coke Machine: Current Status," web page print–out (Feb. 12, 1999) from http://www.cs.cmu.edu/~coke/ (1 page).

"The Switzerland coke Machine Credits," web page print––out (Feb. 12, 1999) from http://www–swiss.ai.mit.edu/htbin/coke/ (1 page).

"Peter Beebee's Home Page," web page print–out (Feb. 12, 1999) from http://www–swiss.ai.mit.edu/htbin/ptbbgate/jwz/?fetch+personal%2Fmain.text.html (2 pages).

"bsy's List of Internet Accessible Coke Machines," web page print–out (Feb. 12, 1999) from http://www–cse.ucs-d.edu/users/bsy/coke.html (1 page).

"I/A Series Model 51 FoxRemote II Installation and Configuration Guide," Apr. 8, 1998 (Preliminary), pp. i–iv, 1–2.

"New State–Logic Microcontroller," News Release, Control Technology Corp., Jun. 1, 1996, (DialogWeb search result).

"New at IPC/92! Ethernet link provides Global PLC Registers" New Release, Control Technology (US), Nov. 20, 1992, (DialogWeb search result).

"New at IPC/92! High–Capacity Integrated Motion Controller," News Release, Control Technology (US) Nov. 20, 1992 (DialogWeb search result).

"Dual–Axis Servo Module for Small Controller," News Release, Control Technology (US), Sep. 11, 1990, (DialogWeb search result).

"Innovative Small Controller Family offers Full Integration," News Release, Control Technology, Aug. 17, 1989, (DialogWeb search result).

"AC I/O Modules Available for Low–Cost Automation Controller," News Release, Control Technology Corporation, Jun. 28, 1989, (DialogWeb search result).

"New Small Automation Controller features Precision Analog I/O Modules," News Release, Control Technology (US), May 30, 1989, (DialogWeb search result).

"Inexpensive Automation Controller features Message Display Capability," News Release, Control Technology (US), May 19, 1989, (DialogWeb search result).

"Small Multi–Tasking Controller for Cost–sensitive Applications," News Release, Control Technology US, Nov. 8, 1988, (DialogWeb search result).

"CAD/CAM Software creates Automation 'Programming Environment'," News Release, Control Technology (US), Oct. 3, 1988, (DialogWeb search result).

"Automation Programming Environment runs On IBM (R)—PC," News Release, Control Technology (US), Mar. 29, 1988, (DialogWeb search result).

"Low–Cost Automation Controller features Motion Control, Communications," News Release, Control Technology (US), Mar. 7, 1988, (DialogWeb search result).

"System Provides Stepping Motor Control in Workcell Environment," News Release, Control Technology Corp., Dec. 5, 1986, (DialogWeb search result).

"Multi–Tasking Controller provides High–level Instructions for Motion Control, Sequencing," News Release, Control Technology Corporation, Aug. 22, 1986, (DialogWeb search result).

"Operator's Console creates 'Friendly' Machines," News Release, Control Technology (US), May 19, 1986, (DialogWeb search result).

"Automation Controller features fast 80186 Processor, Integrated Software," News Release, Control Technology (US), Apr. 22, 1986, (DialogWeb search result).

"Plug–Compatible Controls and Actuators Speed System Development," News Release, Control Technology (US), Jan. 13, 1986, (DialogWeb search result).

"Modular Valve Assemblies Connect to Controller with Ribbon Cable," New Product Release, Control Technology (US), Jan. 8, 1986, (DialogWeb search result).

"Linear Actuators offer Plug–Compatibility with Controller," News Release, Control Technology (US), Nov. 21, 1985, (DialogWeb search result).

"Compact System combines Motion Control, Machine Control," News Release, Control Technology, May 28, 1985, (DialogWeb search result).

"Automation Controller accepts Customization," News Release Control Technology, Jul. 12, 1985, (DialogWeb search result).

"SECS–11 Communication Board Plugs into Automation Controller," News Release, Control Technology, Aug. 26, 1985, (DialogWeb search result).

"Operator's Console for Automated Machines," News Release, Control Technology, Aug. 15, 1985, (DialogWeb search result).

"Programmable Controller offers control of Stepping and Servo Motors," News Release, Control Technology, May 31, 1985, (DialogWeb search result).

Taylor, Ken and Trevelyan, James, "A Telerobot on the World Wide Web," printed from http://telerobot.mech.u-wa.edu.au/ROBOT/telerobo.htm (14 pages).

"On–Line Vending Machine and Catalog Product Icons," IBM TDB, v. 38, n. 4 (Apr. 1995), pp. 113–116.

Tinham, Brian, "Getting SCADA by web browsner? Supervisory Control and Data Acquisition," Control and Instrumentation, No. 12, vol. 28, Dec. 1996, p. 5.

"Wizards wheel over SCADA systems; Supervisory Control and Data Acquisition," Control and Instrumentation, No. 12, vol. 28, Dec. 1996, p. 23.

Fulcher, Jim and Dilger, Karen Abramic, "Soft control, Internet spark ISA/96," Manufacturing Systems, vol. 14, No. 12, Dec. 1996, pp. 40–46.

"Information technology in manufacturing," Manufacturing Systems, vol. 14, No. 12, Dec. 1996, pp. 54–78.

"A sensation in supervisory control," Manufacturing Systems (Windows NT in manufacturing Supplement), Oct. 1996, pp. 12A–24A.

Demetratekes, Pam. "Go with the info flow; state–of–the–art automation in the food industry; includes related article on computer software for food processors," Food Processing, vol. 57, No. 7, Jul. 1996, p. 47.

"New Products Provide Interactive Graphics Over Web Using Netscape Plug–Ins and Java," PR Newswire, May 20, 1996.

"Integrated Systems; Industry's top embedded operating software supports Java," M2 Presswire, Mar. 4, 1996.

"Ergo Tech upgrades ErgoCim; First 'plug and play' component software for manufacturing," Business Wire, Feb. 15, 1996.

"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.

"Industry's top embedded operating software supports Java; pSOSystem enables Embedded Internet applications and Low–cost Internet appliances," Business Wire, Feb. 1, 1996.

"Gensym introduces G2 WebMiner for accessing and reasoning about data from the World Wide Web," Business Wire, May 15, 1996.

"Gensym introduces Internet connectivity for its G2 family of intelligent real–time software," Business Wire, Mar. 18, 1996.

"Gensym Announces Its Initiative for Leveraging Intelligent Systems with Internet/Intranet Technology," Business Wire, Oct. 7, 1997.

"At Interop, Will ToasterNet Be on the Hot List?" Data Communications, vol. 19, No. 13, Oct. 1990, p. 214.

Zeff, Joe. "Maui Sunset in Real Time (Modems not Optional)," The New York Times, Nov. 27, 1995, Section D, col. 2, p. 5.

Toner, Mike. "Web's view of world far and wide," The Houston Chronicle, Nov. 5, 1995, p. 6.

"Internet windows to the world," New Media Age, Oct. 26, 1995, p. 4.

Foster, Kirsten. "surf's up; lights, camera, but no action; Steve is a Tech–Nomad. He wanders the streets with a camera on his head. And he wants you to join him," The Independent (London), Aug. 13, 1995, p. 10.

Henry, Jim, Ph.D., P.E. "Implementation of Practical Control Systems: Problems and Solutions," web page print–out from http://chem.engr.utc.edu/Documents/MACSCITECH/MACSCITECHpaper1.html (22 pages).

"Jim Henry's 1996 ASEE Paper," web page print–out from http://chem.engr.utc.edu/Documents/ASEE–96–full.html (5 pages).

Henry, Jim, Ph.D., P.E. "LabVIEW Applications in Engineering Labs: Controls, Chemical, Environmental," ASEE Conference, Anaheim, CA, Jun. 25–28, 1995, web page print-out from http://chem.engr.utc.edu/Documents/ASEE-95-full.html (22 pages).

"Breaking News for Invensys Software Systems Employees; iBaan and FactorySuite 2000 Integration Announced," internal e-mail dated Mar. 23, 2001.

Gertz, Matthew, et al. "A Human–Machine Interface for Distributed Virtual Laboratories," IEEE Robotics & Automation Magazine 1 (Dec. 1994), No. 4 (New York) pp. 5–13.

Soreide, N. N., et al. "Mosaic access to real-time data from the TOGA-TAO array of moored buoys," Computer Networks and ISDN Systems 28 (1995), pp. 189–197.

Goldstein, Ira and Hardin, Joseph. "Guest editorial," Computer Networks and ISDN Systems 28 (1995) p. 1.

Slater, A. F. "Controlled by the Web," Computer Networks and ISDN Systems 27 (1994) pp. 289–295.

Goldberg, Ken, et al. "Beyond the Web: manipulating the real world," Computer Networks and ISDN Systems 28 (1995) pp. 209–219.

Goldstein, Ira and Hardin, Joseph, "Guest editorial," Computer Networks and ISDN Systems 28 (1995) p. 1.

Goldberg, Ken, et al. "Desktop Teleoperation via the World Wide Web," IEEE International Conference on Robotics and Automation, pp. 654–659.

* cited by examiner

PROCESS CONTROL SYSTEM AND METHOD WITH AUTOMATIC FAULT AVOIDANCE

BACKGROUND OF THE INVENTION

The invention pertains to control and, more particularly, to methods and apparatus for avoidance of faults in process and other control systems.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor the device or system in question and automatically adjust its operational parameters. In other control systems, such apparatus monitor the device or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in electric and other service industries. Environmental control finds application in residential, commercial, institutional and industrial settings, where temperature and other environmental factors must be properly maintained. Control is also used in articles of manufacture, from toasters to aircraft, to monitor and control device operation.

Reliability is among the key requirements of any control system. A controlled manufacturing process, for example, that occasionally produces a bad batch is wholly unacceptable for many purposes. Given the expense of manufacturing individual process control components that achieve satisfactory levels of reliability, designers have turned to redundancy. This typically involves using two or more control elements in place of one. The duplicated units can be sensors, actuators, controllers or other components in the control hierarchy.

Thus, for example, U.S. Pat. No. 4,347,563 discloses an industrial control system in which redundant processing units serve as bus masters "of the moment," monitoring status information generated by primary processing units. If a redundant unit detects that a primary has gone faulty while executing an applications program, the redundant unit loads that program and takes over the primary's function. A shortcoming of these and many other prior art redundancy schemes is their imposition of undue computational or hardware overhead. U.S. Pat. No. 4,058,975, for example, has the disadvantage of requiring a computer to continually compare the outputs of multiple temperature sensors monitoring a gas turbine.

Implementing such solutions can be difficult in some situations and impossible in others. The latter may prove true if the control elements or configuration do not support communications or processing necessary to implement the necessary redundancy protocols.

The self-validating sensors described in U.S. Pat. Nos. 5,570,300 and 5,774,378 (assigned to the assignee hereof and the teachings of which are incorporated herein by reference) represent a significant advance in the art. Such sensors provide not only estimates of control variables (e.g., pressure or temperature) being monitored, but also information about the uncertainty and reliability of those estimates. Thus, for example, a sensor can generate a validated measurement signal (VMV) representing a best estimate of a control variable being monitored, a validated uncertainty signal (VU) identifying the uncertainty in VMV, a status signal (MV) indicating the status of VMV (e.g., "clear," "blurred," "dazzled," "blind,"), and a device status signal indicating a status of the sensor itself.

Notwithstanding the advent of self-validating sensors, still more flexible mechanisms for avoiding fault are desired. This is increasingly so as the art shifts to control architectures that permit the "hot" insertion or replacement of control elements.

An object of this invention is to provide improved methods and apparatus for control and, more particularly, improved such methods and apparatus that provide for avoidance of detected faults.

A further object of the invention is to provide such methods and apparatus as facilitate maintaining continuous operation of a process, environmental, industrial or other control system in the face of actual or potential degradation of a sensor or other control element.

A still further object of the invention is to provide such methods and apparatus for use with self-validating control elements and particularly, for example, with self-validating sensors.

SUMMARY OF THE INVENTION

The foregoing are among the objects attained by the invention which provides, in one aspect, a control system with components that respond to actual or potential faults, e.g., in sensors or other field devices, by automatically switching to other sources of desired control or process variables.

Thus, in one aspect, the invention provides a control system with first and second control components that generate first and second "source" signals, respectively, representing substantially identical or related process control variables. A third control component, which normally processes the first source signal, responds to actual or potential degradation of that signal (or the control component that generated it) for processing the second source signal in lieu of the first.

By way of example, a process control system according to this aspect of the invention can have a first sensor that generates a temperature reading of a reactor vessel and a second sensor that generates a pressure reading of that same vessel. A control processor can be arranged to process the reading generated by the first sensor, e.g., as part of a temperature control loop. In response to indications of actual or potential degradation of the first sensor, the control processor can process readings from the second sensor, e.g., in lieu of those from the first.

Further aspects of the invention provide a control system as described above in which the first control component (e.g., the first sensor in the above example) generates a confidence signal indicative of actual or potential degradation of the first sensor. Where the first component is a self-validating sensor, that confidence can be a measurement value (MV) status signal and/or a device status signal, both as described above. The third control component (e.g., the control processor in the example) can identify actual or potential degradation of the first control component from that confidence signal.

Still further aspects of the invention provide a control system as described above in which the second control component (e.g., the second sensor in the example) generates a signal identifying the control variable (e.g., temperature or pressure) output by it. The second component can transmit that signal, e.g., to a distributed registry, for storage. The third control component can retrieve the identifier signal from the registry in the event of actual or potential degradation of the first source signal, thus, permitting identification of the second source signal as a potential substitute for the first.

Yet still further aspects of the invention provide a control system as described above in which the control components and/or registry are coupled via bus, a network and other communications media, by way of non-limiting example, compatible with any of Foundation Fieldbus, Profibus, DeviceNet™, InterBus™ and Modbus® standards, among others.

Other aspects of the invention provide process, environment, industrial control systems and methods in accord with the foregoing.

These and still other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
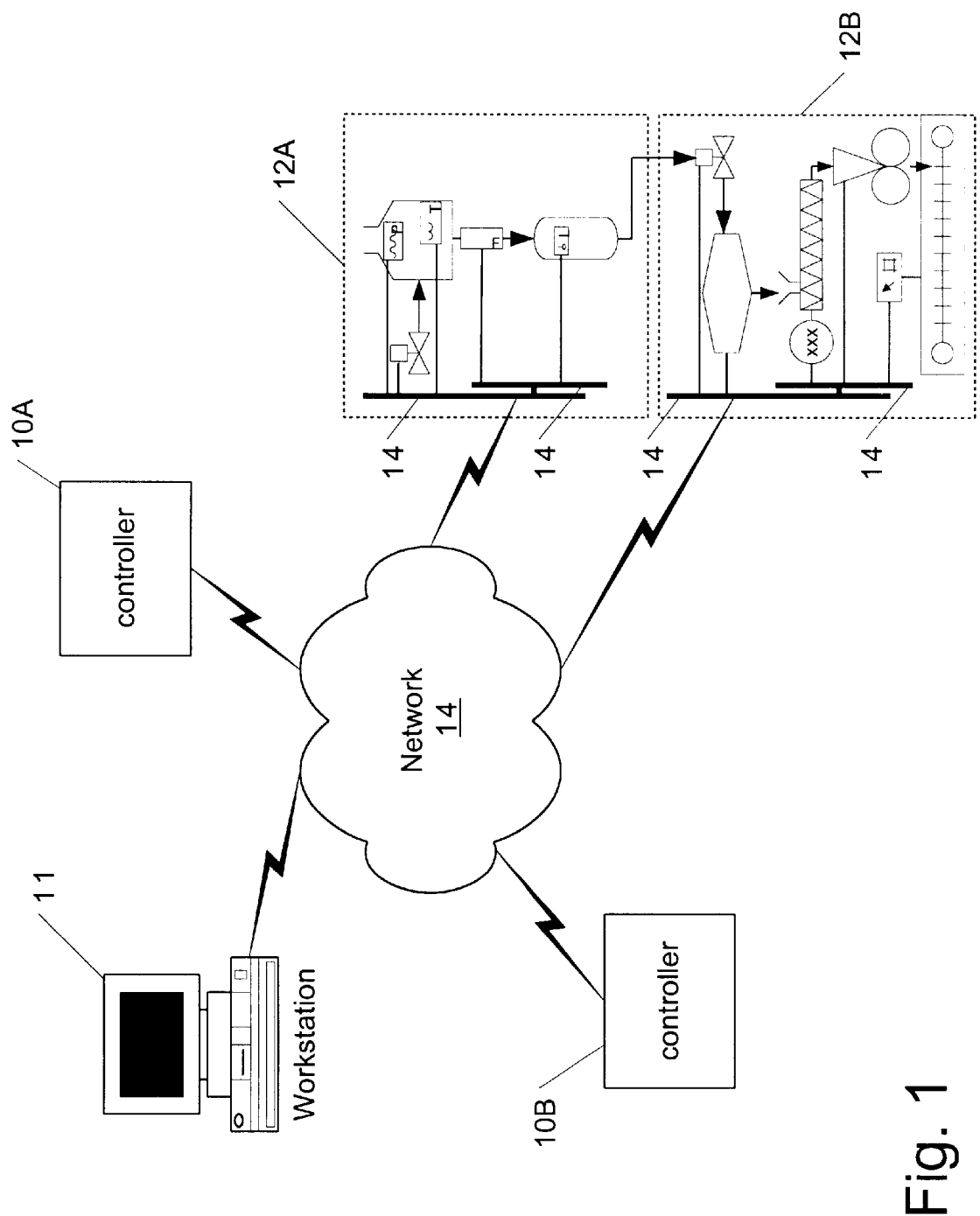
FIG. 1 depicts a digital data processing system of the type with which apparatus and methods according to the invention may be practiced.

FIG. 1 depicts a digital data processing system of the type with which apparatus and methods according to the invention may be practiced. The system includes one or more controllers 10A, 10B or other digital data processors that monitor and/or control one or more manufacturing, industrial or other processes 12A, 12B. The illustrated controllers 10A, 10B represent hardware or software processes executing on workstations, microprocessors, embedded processors, "smart" field devices, or other digital data processing apparatus of the types commercially available in the marketplace, constructed and operated in accord with the teachings herein to achieve fault-avoidance in process control.

Workstation 11 represents a personal computer, mainframe computer or other digital data processing device that can be used, e.g., by an operator, to monitor and/or administer controllers 10A, 10B. While workstation 11 can be independent of the other devices shown in the drawing, it can alternatively incorporate functionality of controllers 10A, 10B. Conversely, monitoring and/or administrative functionality of workstation 11 can be contained in microprocessors, embedded processors, controllers, "smart" field devices that serve other functions in the control system.

Network 14 provides a communications medium for the transfer of data and control information among components of the control system, including, controllers 10A, 10B, workstation 11, blocks 32–42, and field devices. Though illustrated to represent a LAN, WAN, or global network (Internet), those skilled in the art will appreciate that element 14 may comprise a bus or other communications medium through which information may be transferred. In preferred embodiments, at least portions of the network 14 comprise buses compatible with industry standards such as, by non-limiting example, Foundation Fieldbus, Profibus, DeviceNet™, InterBus™ and/or Modbus®.

Figure 2:
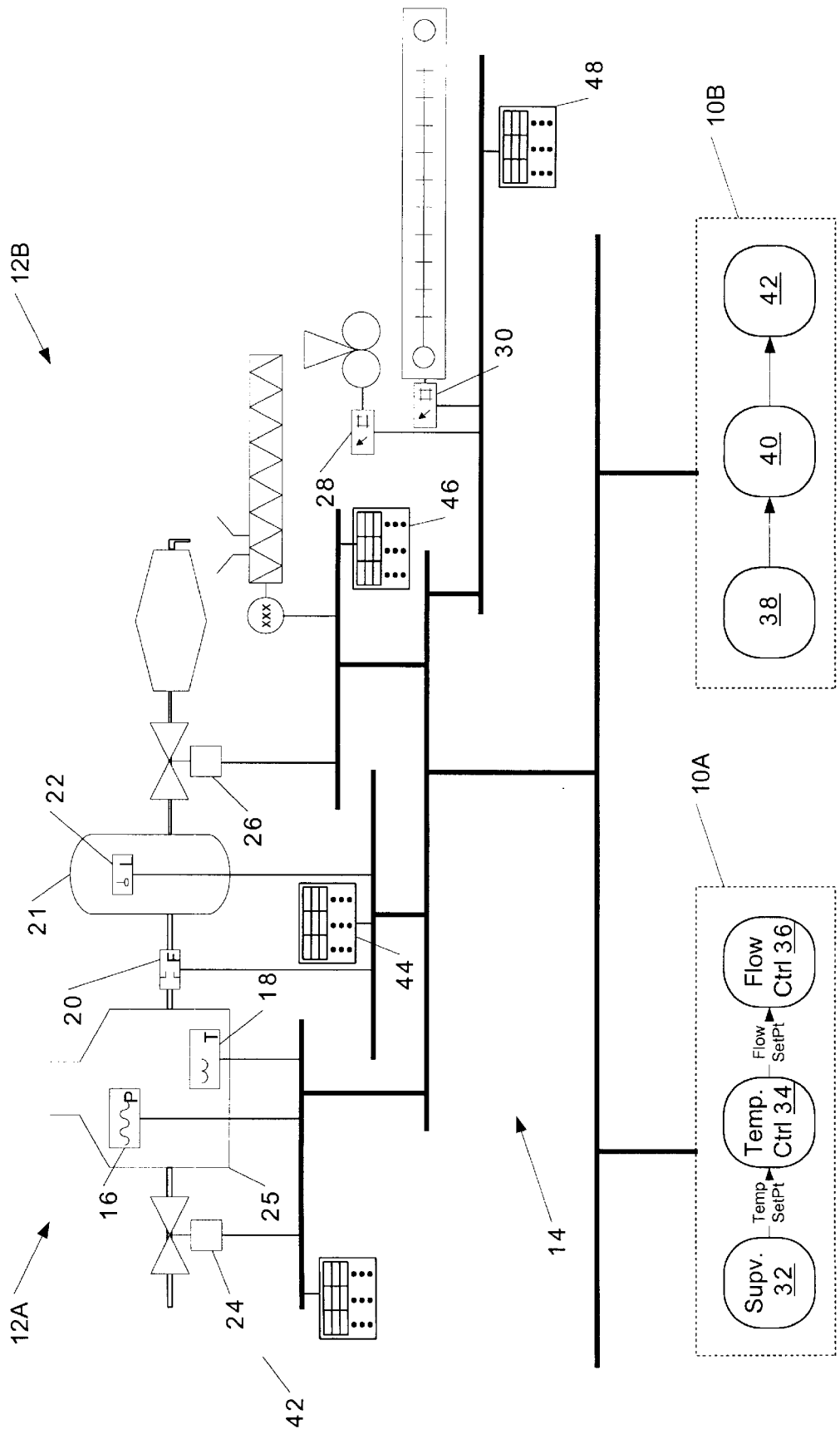
FIG. 2 illustrates controlled processes, along with a fault-avoidance process control system according to the invention for controlling them.

FIG. 2 illustrates in greater detail processes 12A, 12B and a control system according to the invention for controlling them. In the illustration, exemplary process 12A is a manufacturing process including conventional processing equipment, such as by way of non-limiting example conveyors, aeration tanks, and so forth. Control of the process 12A is effected through flow sensors, pressure sensors, temperature sensors, level sensors, valves, recorders, positioners, or other sensors or actuators operating with outputs and inputs in the range of 4–20 mA or 1–5 V dc, or otherwise, per proprietary or industry protocol (collectively, "field devices"). In the illustrated embodiment, these include valve 24 that governs the rate of fluid flow to a reactor vessel 25, whose temperature and pressure are monitored by sensors 16, 18. These also include flow sensor 20 that monitors the outflow of vessel 25 to tank 21. In a preferred embodiment, one or more of the sensors are "smart" field devices, i.e., sensors or actuators that include embedded processors, microprocessors or other digital data processing capacity, operating in accord with the teachings herein.

Whether of the "smart" variety or otherwise, one or more of the sensors 16, 18, 20 can be of the self-validating variety that output estimates of measured process variables (e.g., pressure, temperature, flow, respectively), along with information about the uncertainty and reliability of those estimates. Preferred self-validating sensors include, by way of non-limiting example, those taught in incorporated-by-reference U.S. Pat. Nos. 5,570,300 and 5,774,378. Such sensors generate a validated measurement signal (VMV) representing a best estimate of a process variable being monitored, a validated uncertainty signal (VU) identifying the uncertainty in VMV, a status signal (MV) indicating the status of VMV (e.g., "clear," "blurred," "dazzled," "blind,"), and a device status signal indicating a status of the sensor itself.

Monitoring and control of processes 12A, 12B is further effected through controllers 10A, 10B that are coupled to field devices 16–30, as well as to one another, via network 14. The controllers execute control strategies in the conventional manner known in the art as modified in accord with the teachings herein.

To this end, the controllers 10A, 10B comprise blocks and/or other executable software components (collectively, "blocks") 32–42 that model field devices, processing apparatus and other aspects of the controlled process 12A and that monitor and/or control the states and interactions therebetween, e.g., via execution of control algorithms (or portions thereof) or otherwise. In the illustrated embodiment, blocks 32–42 comprise blocks of the type utilized in the I/A Series® systems marketed by the assignee hereof and/or objects of the type disclosed in co-pending commonly assigned patent applications 60/139,071, filed Jun. 11, 1999, entitled "Omnibus and Web Control," 60/144,693, filed Jul. 20, 1999, entitled "Omnibus and Web Control," 60/146,406, filed Jul. 29, 1999, entitled "Bi-Directional Entities for Maintaining Block Parameters and Status in a Process Control System," and 60/149,276, filed Aug. 17, 1999, entitled "Methods and Apparatus for Process Control (AutoArchitecture)," the teachings of all of which are incorporated herein by reference. The blocks 32–42 may represent other software and/or hardware components capable of executing on or in connection with controllers 10A, 10B. For example, the blocks may be various types of function blocks, or the like, as defined and executed within the aforementioned Foundation Fieldbus, Profibus, DeviceNet™, InterBus™ and Modbus® or other industry standards.

Blocks 32–42 operate in the conventional manner known in the art, as modified in accord with the teachings herein for fault avoidance. Thus, for example, controller 10A includes supervisor 32, temperature controller 34 and flow controller 36, each of which may include further blocks (not shown). Supervisor component 32 initiates process control functions, including activation and execution of blocks 34, 36. Block 32 also generates a temperature supervisory set point, e.g., based on operator input. Block 34 is a temperature controller that utilizes a proportional-integral-derivative (PID) or other control algorithm to generate a flow set point based on the temperature set point from the supervisor object 32 and on temperature readings from sensor 18. Block 36 serves as a flow controller that, too, utilizes a PID or other control algorithm to set a flow level, e.g., for valve 24, based on the flow set point from block 34 and on flow readings from sensor 20.

In process control terminology, supervisor 32 is referred to as a "source" for temperature controller 34 and, more accurately, for the temperature set point parameter used by controller 34. Temperature sensor 18 is also a source for controller 34. The flow controller 36, conversely, is referred to as a "sink" for temperature controller 34 and, more accurately, for the flow set point parameter generated by it. Like terminology can be applied to the other elements and parameters that are sources (i.e., suppliers) or sinks (i.e., consumers) of information produced within the system.

The illustrated apparatus includes one or more registries 42–48 to maintain information about the field devices 16–32. These can be contained in memory or other data stores within workstation 11, within the processors 10A, 10B, within smart field devices 16–32, within stand-alone storage devices (as illustrated), or otherwise. Where more than one registry is provided, they can be distributed among domains and, indeed, among the field devices themselves. The registries can be implemented as pointers, symbols, objects, variables, vectors, tables, records, databases, files, or other data structures or stores. They can be implemented as stand-alone entities or, for example, within other system components such as function blocks, or the like, as defined and executed within the aforementioned Foundation Fieldbus, Profibus, DeviceNet™, InterBus™ and Modbus® or other industry standards.

The registries maintain information about the control or process variables monitored by sensor-type field devices. Thus, for example, entries in registry 42 can indicate that sensor 16 monitors the pressure of vessel 25 and that sensor 18 monitors the temperature of that vessel. Registry 44, by way of further example, can indicate that sensor 20 monitors flow in the conduit between vessel 25 and tank 21. The registries can also maintain information about process variables governed by actuator-type sensors. Other information can be maintained in the registries, as well, for example identifiers of sources and/or sinks of each of the elements in the process control system.

In the illustrated embodiment, each process control component 32–42 maintains, e.g., in its own dedicated store or in a registry, identities of the process variables supplied to it by the "sources." Identities and other information regarding the sources can be maintained as well. Thus, for example, temperature controller 34 maintains an internal store indicating that one of its sources, sensor 18, supplies the temperature of vessel 25.

Figure 3:
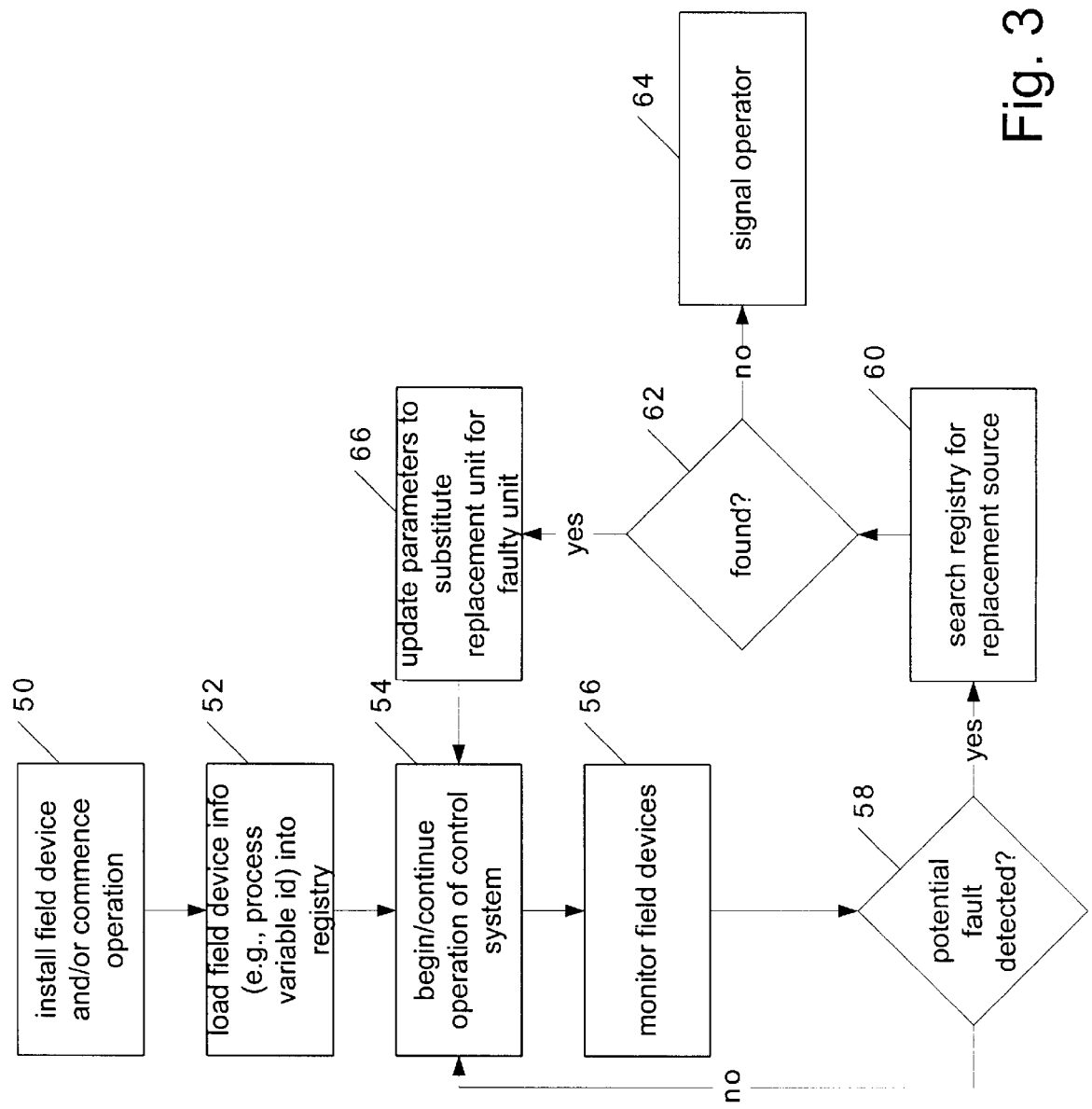
FIG. 3 is a flowchart depicting operation of a fault-avoidance process control system according to the invention.

FIG. 3 is a flowchart depicting how the process control system of FIG. 2 provides for fault-avoidance. In steps 50–52, each field device "registers" with the system upon "hot" insertion, installation or commencement of operation. In the illustrated embodiment, registration is performed by sensor-type field devices, e.g., pressure, temperature and flow sensors 16–20, and entails generating an identifier indicating which process variable is monitored by each sensor. Thus, for example, sensor 16 generates an identifier signal indicating that it monitors the pressure of vessel 25, while sensor 18 generates a signal indicating that it monitors the temperature of that vessel. These identifier signals are stored in registry 42, or elsewhere, as discussed above.

The identifier signal generated by the field device can be based, for example, on information stored in the sensor, or otherwise supplied to the system, e.g., by a field technician prior to (or concurrent with) insertion. Alternatively, by way of further non-limiting example, it can be based on keys, tags or other physical indicia installed on or in the field device.

In step 54, controllers 10A, 10B commence operation, monitoring and/or controlling operation of processes 12A, 12B.

In step 56, each component 32–42 (FIG. 2) monitors its sources to identify actual or potential degradation of the information supplied by them. Where the sources are self-validating field devices, as described above, the recipient component (or sink) utilizes the above-described status signals as means of determining actual or potential fault. In this regard, for example, temperature controller 34 can identify as faulty a source (e.g., sensor 18) generating an MV signal of "blurred," "dazzled," "blind."

For sources that are not self-validating, the recipient process control components, i.e., blocks 32–42, can monitor process variables, statistically or otherwise, to identify actual or potential degradation. Still other elements resident in the controllers and/or in the control system (e.g., other field devices) can monitor sources and notify recipients of actual or potential degradation. The detection of fault by recipient components or other elements can be based on principles paralleling those discussed in incorporated-by reference U.S. Pat. Nos. 5,570,300 and 5,774,378, or otherwise.

In step 58, processing continues in the normal course unless an actual or potential fault is detected in a source (e.g., temperature sensor 18). Upon detection of such a fault, the recipient component (e.g., temperature controller 34) seeks a replacement source. Step 60. Alternatively, another component or element in the system (e.g., supervisor component 32) seeks a replacement on behalf of the recipient.

In either event, the replacement is identified via a search of registries 42–48 for a source that provides an identical or related process variable to that identified as actually or potentially faulty. Thus, for example, in the event readings from temperature sensor 18 are detected as actually or potentially faulty, readings from another temperature sensor (not shown) on the same vessel 25 could be identified for use as replacements.

In the illustrated embodiment, pressure sensor 16 is deemed to provide a "related" process variable, since the temperature of the contents vessel 25 can be determined with acceptable accuracy from its pressure.

In still further embodiments, replacement readings are taken from sensors or other process control components that measure (or otherwise generate) an identical or related process variable but that normally output another process variable. Examples of this include multi measurement sensors, e.g., a flow sensor 20 implemented as a CFT10 Series I/A Series® mass flow transmitter of the type commercially available from the assignee hereof. Though such a sensor typically outputs a flow reading, it measures temperature (along with other flow-related variables) in order to normalize the flow reading. Upon determining that temperature readings from sensor 18 are actually or potentially faulty, temperature controller 34 can utilize the temperature readings generated by mass flow sensor 20 as replacements. This is likewise true of (i) multimeasurement sensors that measure or otherwise generate "related" process variables, such as pressure in the above example, and (ii) blocks and other process components that generate identical or related process variables by way of calculations performed during execution of a control algorithm or otherwise.

If no replacement source is found (step 62), the operator is notified. Step 64. System operation may nonetheless continue, depending on the nature of the fault.

If a replacement source is found (step 66), its outputs are coupled to the inputs of the recipient component. The manner in which this is accomplished varies in accord with the specific nature of source/sink coupling in controller 10A. For example, if each component (e.g., temperature controller 34) maintains pointers to its sources (e.g., temperature sensor 18), replacement is effected by substituting a pointer to the replacement element (e.g., pressure sensor 16) for that of the actually or potentially faulty element (e.g., temperature sensor 18). Alternatively, if source information is coded into component via a configurator (not shown), such a configurator may be employed to impart sufficient information to effect replacement. In the event that the replacement source does not provide identical information to that provided by the actually or potentially fault source, the recipient executes appropriate conversions (e.g., pressure-to-temperature conversions) and/or compensates for differences in uncertainty or accuracy, e.g., using alternate control algorithms in order to insure proper operation.

Once a source, previously detected as actually or potentially faulty, resumes normal operation (e.g., as a result of physical repair or replacement by a technician or as a result of termination of a transient fault condition), it can be coupled back into the system—thus, in effect, replacing its replacement. For example, a repaired source can register with the system upon being brought on-line and, in the process, send a local or system-wide notification, e.g., over medium 14 or portions thereof. Recipients or sinks of information generated by the repaired source can recouple with it, as described above. Such recoupling can be predicated, for example, on a comparison of tolerances, accuracy or other operational parameters of the repaired source and the replacement that had been substituted for it on detection of the original fault condition.

Described above are methods and apparatus achieving the desired objects. Those skilled in the art will appreciate that the embodiments described herein and shown in the drawings are examples of the invention and that other embodiments incorporating one or more of the mechanisms and techniques herein, or equivalents thereof, fall within the scope of the invention.

Thus, for example, further embodiments of the invention provide environmental control systems utilizing apparatus and methods like those herein to monitor and/or control heating, ventilation, cooling, and other environmental factors. Yet still further embodiments of the invention provide industrial control systems, manufacturing control systems, or the like, that also utilize apparatus and methods like those herein to monitor and/or control respective industrial, manufacturing or other processes.

In view of the foregoing, what is claimed is:

1. A control system comprising
   a first set comprising plural control components, each control component generating a source signal representative of control variable, an identifier signal identifying that control variable, and a confidence signal indicative of any of actual and potential degradation of that source signal,
   a second set comprising at least one control component that processes a selected source signal and that responds to any of actual and potential degradation that source signal by (i) identifying from the identifier signals an alternate source signal, and (ii) processing that alternate source signal in lieu of the selected source signal,
   wherein the first and second sets have any of zero, one or more control components in common.

2. A control system according to claim 1, wherein at least the control component that generates the selected source signal is self-validating.

3. A control system according to claim 2, wherein the self-validating control component generates the confidence signal to be representative of any of a status of a value represented by the corresponding source signal and a status of the control component.

4. A control system according to claim 1, comprising one or more registries that are coupled to the control components in the first and second sets for storing the identifier signals.

5. A control system according to claim 4, comprising a plurality of distributed registries.

6. A control system according to claim 1, wherein the control components of the first and second sets are coupled by any of a bus, a network and other communications media.

7. A control system according to claim 6, wherein the control components of the first and second sets are coupled by communications media operable in accord with any of a Foundation Fieldbus standard, a Profibus standard, a DeviceNet™ standard, an InterBus™ standard and a Modbus® standard.

8. A control system comprising
   a first set comprising plural control components, each control component generating a source signal representative of control variable, and a confidence signal indicative of any of actual and potential degradation of that source signal,
   one or more registries that store identifier signals, each identifying a control variable and any of a control signal or control component corresponding thereto,
   a second set comprising at least one control component that processes a selected source signal and that responds to any of actual and potential degradation that source signal by (i) identifying from the identifier signals an alternate source signal, and (ii) processing that alternate source signal in lieu of the selected source signal,
   wherein the first and second sets have any of zero, one or more control components in common,
   wherein the registries, the control components of the first set and the control components of the second set are coupled by communications media operable in accord with any of a Foundation Fieldbus standard, a Profibus standard, a DeviceNet™ standard, an InterBus™ standard and a Modbus® standard.

9. A process control system comprising
 a first set comprising plural process control components, each process control component generating a source signal representative of process variable, an identifier signal identifying that process variable, and a confidence signal indicative of any of actual and potential degradation of that source signal,
 a second set comprising at least one process control component that processes a selected source signal and that responds to any of actual and potential degradation that source signal by (i) identifying from the identifier signals an alternate source signal, and (ii) processing that alternate source signal in lieu of the selected source signal,
 wherein the first and second sets have any of zero, one or more process control components in common.

10. A process control system according to claim 9, wherein at least the process control component that generates the selected source signal is a self-validating process control component.

11. A process control system according to claim 10, wherein the self-validating process control component generates the confidence signal to be representative of any of a status of a value represented by the corresponding source signal and a status of the process control component.

12. A process control system according to claim 9, comprising one or more registries that are coupled to the process control components in the first and second sets for storing the identifier signals.

13. A process control system according to claim 12, wherein the registries are distributed.

14. A process control system according to claim 9, wherein the process control components of the first and second sets are coupled by any of a bus, a network and other communications media.

15. A process control system according to claim 14, wherein the process control components of the first and second sets are coupled by communications media operable in accord with any of a Foundation Fieldbus standard, a Profibus standard, a DeviceNet™ standard, an InterBus™ standard and a Modbus® standard.

16. A process control system comprising
 a first set comprising plural process control components, each process control component generating a source signal representative of process variable, and a confidence signal indicative of any of actual and potential degradation of that source signal,
 one or more registries that store identifier signals, each identifying a process variable and any of a control signal or process control component corresponding thereto,
 a second set comprising at least one process control component that processes a selected source signal and that responds to any of actual and potential degradation of that source signal by (i) identifying from the identifier signals an alternate source signal, and (ii) processing that alternate source signal in lieu of the selected source signal,
 wherein the first and second sets have any of zero, one or more process control components in common,
 wherein the registries, the process control components of the first set and the process control components of the second set are coupled by communications media operable in accord with any of a Foundation Fieldbus standard, a Profibus standard, a DeviceNet™ standard, an InterBus™ standard and a Modbus® standard.

17. A method of operating a control system, comprising
 generating, with each control component in a first set of plural control components, a source signal representative of a control variable and confidence signals indicative of any of actual and potential degradation of that source signal,
 storing, in one or more registries, one or more identifier signals that identify control variables and any of control signals and control component corresponding thereto,
 with a control component of a second set that comprises at least one control component, processing a selected source signal and responding to any of actual and potential degradation that selected source signal by (i) identifying from the identifier signals in the registries an alternate source signal, and (ii) processing that alternate source signal in lieu of the selected source signal,
 wherein the first and second sets have any of zero, one or more control components in common,
 transferring information among any of the registries and the control components via a communications medium operable in accord with any of a Foundation Fieldbus standard, a Profibus standard, a DeviceNet™ standard, an InterBus™ standard and a Modbus® standard.

18. A method of operating a process control system, comprising
 generating, with each process control component in a first set of plural process control components, a source signal representative of process variable, an identifier signal identifying that process variable, and a confidence signal indicative of any of actual and potential degradation of that source signal,
 with a process control component in a second set comprising at least one process control component, processing a selected source signal and responding to any of actual and potential degradation that source signal by (i) identifying from the identifier signals an alternate source signal, and (ii) processing that alternate source signal in lieu of the selected source signal,
 wherein the first and second sets have any of zero, one or more process control components in common.

19. A method according to claim 18, wherein at least the process control component that generates the selected source signal is a self-validating process control component.

20. A method according to claim 19, comprising generating, with the self-validating process control component, the confidence signal to be representative of any of a status of a value represented by the corresponding source signal and a status of the self-validating process control component.

21. A method according to claim 18, comprising storing the identifier signals in one or more registries.

22. A method according to claim 21, wherein the registries are distributed about the process control system.

23. A method according to claim 18, comprising transferring information among any of the process control components via any of a bus, a network and other communications media.

24. A method according to claim 23, comprising transferring information among any of the process control components via communications media operable in accord with any of a Foundation Fieldbus standard, a Profibus standard, a DeviceNet™ standard, an InterBus™ standard and a Modbus® standard.

25. A method of operating a process control system comprising
generating, with each process control component in a first set of plural process control components, a source signal representative of process variable and a confidence signal indicative of any of actual and potential degradation of that source signal,
storing identifier signals in one or more registries, each identifying a process variable and any of a control signal or process control component corresponding thereto,
with a process control component in second set comprising at least one process control component, processing a selected source signal and responding to any of actual and potential degradation of that source signal by (i) identifying from the identifier signals an alternate source signal, and (ii) processing that alternate source signal in lieu of the selected source signal,
transferring information among any of the registries and the control components via a communications medium operable in accord with any of a Foundation Fieldbus standard, a Profibus standard, a DeviceNet™ standard, an InterBus™ standard and a Modbus® standard,
wherein the first and second sets have any of zero, one or more process control components in common.

26. A control system comprising
a first control component generating a first source signal,
a third control component that is in at least selective communication with the first control component,
the third control component processing the first source signal and responding to any of actual and potential degradation of that signal by selectively processing a second source signal, generated by a second control component, in lieu of the first source signal, such selective processing being in response to an identifier signal identifying the second source signal as representative of a control variable that is any of substantially identical to and related to a control variable represented by the first source signal.

27. A control system according to claim 26, wherein the first control component generates a confidence signal indicative of any of actual and potential degradation of the first source signal.

28. A control system according to claim 27, wherein the first control component is self-validating.

29. A control system according to claim 27, wherein the first source signal is a measurement.

30. A control system according to claim 29, wherein the first control component is self-validating sensor.

31. A control system according to claim 27, wherein the second control component generates an identifier signal identifying a control variable represented by the second source signal.

32. A control system according to claim 31, wherein the third control component processes the second source signal in lieu of the first source signal in response to a confidence signal indicative of any of actual and potential degradation of the first control signal and in response to an identifier signal identifying the second source signal as representative of a control variable that is any of substantially identical to and related to a control variable represented by the first source signal.

33. A control system according to claim 31, comprising a registry that stores the identifier signal.

34. A control system according to claim 33, wherein the third control component obtains the identifier signal from the registry.

35. A process control system comprising
a first process control component generating a first source signal,
a third process control component that is in at least selective communication with the first process control component,
the third process control component processing the first source signal and responding to any of actual and potential degradation of that signal by selectively processing a second source signal, generated by a second process control component, in lieu of the first source signal, such selective processing being in response to an identifier signal identifying the second source signal as representative of a control variable that is any of substantially identical to and related to a control variable represented by the first source signal.

36. A process control system according to claim 35, wherein the first process control component generates a confidence signal indicative of any of actual and potential degradation of the first source signal.

37. A process control system according to claim 36, wherein the first process control component is self-validating.

38. A process control system according to claim 36, wherein the first source signal is a measurement.

39. A process control system according to claim 38, wherein the first process control component is self-validating sensor.

40. A process control system according to claim 36, wherein the second process control component generates an identifier signal identifying the process variable represented by the second source signal.

41. A process control system according to claim 40, wherein the third process control component processes the second source signal in lieu of the first source signal in response to a confidence signal indicative of any of actual and potential degradation of the first control signal and in response to an identifier signal identifying the second source signal as representing a process variable that is any of substantially identical or related to the process variable represented by the first control signal.

42. A process control system according to claim 40, comprising a registry that stores the identifier signal.

43. A process control system according to claim 42, wherein the third process control component obtains the identifier signal from the registry.

44. A process control system comprising
a first field device generating a first source signal,
a process control component in communication with the first field device,
the process control component processing the first source signal and responding to any of actual and potential degradation of that signal by selectively processing a second source signal, generated by a second process control component, in lieu of the first source signal, such selective processing being in response to an identifier signal identifying the second source signal as representative of a control variable that is any of substantially identical to and related to a control variable represented by the first source signal.

45. A process control system according to claim 44, wherein the process control component is a controller.

46. A process control system according to claim 44, wherein the process control component is coupled with any of the first field device and the second field device by any of a bus, a network and other communications media.

47. A process control system according to claim 46, wherein process control component is coupled with any of the first field device and the second field device by communications media operable in accord with any of a Foundation Fieldbus standard, a Profibus standard, a DeviceNet™ standard, an InterBus™ standard and a Modbus® standard.

48. A process control system according to claim 44, wherein the first source signal and the second source signal represent a characteristic of a same process element and a same process control component.

49. A process control system according to claim 48, wherein the first source signal and the second source signal represent related characteristics of any of a same process element and a same process control component.

50. A process control system according to claim 49, wherein the first field device generates a confidence signal indicative of any of actual and potential degradation of the first source signal.

51. A process control system according to claim 50, wherein the first field device is self-validating.

52. A process control system according to claim 50, wherein the first source signal is a measurement.

53. A process control system according to claim 52, wherein the first field device is self-validating sensor.

54. A process control system according to claim 50, wherein the second field device generates an identifier signal identifying the process variable represented by the second source signal.

55. A process control system according to claim 54, wherein the process control component processes the second source signal in lieu of the first source signal in response to a confidence signal indicative of any of actual and potential degradation of the first control signal and in response to an identifier signal identifying the second source signal as representing a process variable that is any of substantially identical or related to the process variable represented by the first control signal.

56. A process control system according to claim 54, comprising a registry that stores the identifier signal.

57. A process control system according to claim 56, wherein the process control component obtains the identifier signal from the registry.

58. A method of operating a control system, comprising the steps of generating, with a first control component, a first source signal, with a third control component processing the first source signal and responding to any of actual and potential degradation of that signal by selectively processing a second source signal in lieu of the first source signal, such selective processing being in response to an identifier signal identifying the second source signal as representative of a control variable that is any of substantially identical to and related to a control variable represented by the first source signal.

59. A method of operating a control system according to claim 58, comprising the step of generating, with the first control component, a confidence signal indicative of any of actual and potential degradation of the first source signal.

60. A method of operating a control system according to claim 59, wherein the first control component is self-validating.

61. A method of operating a control system according to claim 59, comprising the step of generating the first source signal as a measurement.

62. A method of operating a control system according to claim 61, wherein the first control component is self-validating sensor.

63. A method of operating a control system according to claim 59, comprising the step of generating, with the second control component, an identifier signal identifying the control variable represented by the second source signal.

64. A method of operating a control system according to claim 63, comprising the step of responding to a confidence signal indicative of any of actual and potential degradation of the first control signal and to an identifier signal identifying the control variable represented by the second source signal as any of substantially identical and related to the control variable represented by the first source signal, by processing, with the third control component, the second source signal in lieu of the first source signal.

65. A method of operating a control system according to claim 63, comprising the step of storing the identifier signal in a registry.

66. A method of operating a control system according to claim 65, comprising the step of using the third control component to obtain the identifier signal from the registry.

67. A method of operating a process control system, comprising the steps of generating, with a first process control component, a first source signal, with a third process control component, processing the first source signal and responding to any of actual and potential degradation of that signal by selectively processing a second source signal in lieu of the first source signal, such selective processing being in response to an identifier signal identifying the second source signal as representative of a control variable that is any of substantially identical to and related to a control variable represented by the first source signal.

68. A method of operating a process control system according to claim 67, comprising the step of generating, with the first process control component, a confidence signal indicative of any of actual and potential degradation the first source signal.

69. A method of operating a process control system according to claim 68, wherein the first process control component is self-validating.

70. A method of operating a process control system according to claim 68, comprising the step of generating the first source signal as a measurement.

71. A method of operating a process control system according to claim 70, wherein the first process control component is self-validating sensor.

72. A method of operating a process control system according to claim 68, comprising the step of generating, with the second process control component, an identifier signal identifying the process variable represented by the second source signal.

73. A method of operating a process control system according to claim 72, wherein the third process control component processes the second source signal in lieu of the first source signal in response to a confidence signal indicative of any of actual and potential degradation the first control signal and to an identifier signal identifying the second source signal as representing a process variable that is any of substantially identical and related to the process variable represented by the first source signal.

74. A method of operating a process control system according to claim 72, comprising the step of storing the identifier signal in a registry.

75. A method of operating a process control system according to claim 74, wherein the third process control component obtains the identifier signal from the registry.

76. A method of operating a process control system comprising generating, with a first field device, a first source signal, with a process control component, processing the first source signal and responding to any of actual and potential degradation of that signal by selectively processing a second source signal in lieu of the first source signal, such selective processing being in response to an identifier signal identifying the second source signal as representative of a control variable that is any of substantially identical to and related to a control variable represented by the first source signal.

77. A method of operating a process control system according to claim 76, wherein the process control component is a controller.

78. A method of operating a process control system according to claim 76, comprising communicating between the process control component and any of the first field device and the second field device by way of any of a bus, a network and other communications media.

79. A method of operating a process control system according to claim 78, comprising communicating between the process control component and any of the first field device and the second field device by communications media operable in accord with any of a Foundation Fieldbus standard, a Profibus standard, a DeviceNet™ standard, an InterBus™ standard and a Modbus® standard.

80. A method of operating a process control system according to claim 76, wherein the first and second source signals represent like characteristics of any of a same process element and a same process control component.

81. A method of operating a process control system according to claim 80, wherein the first and second control signals represent related characteristic of any of a same process element and a same process control component.

82. A method of operating a process control system according to claim 81, comprising generating with the first field device a confidence signal indicative of any of actual and potential degradation the first source signal.

83. A method of operating a process control system according to claim 82, wherein the first field device is self-validating.

84. A method of operating a process control system according to claim 82, comprising the step of generating the first source signal as a measurement.

85. A method of operating a process control system according to claim 84, wherein the first field device is self-validating sensor.

86. A method of operating a process control system according to claim 82, comprising generating with the second field device an identifier signal identifying the process variable represented by the second source signal.

87. A method of operating a process control system according to claim 86, comprising responding to a confidence signal indicative of any of actual and potential degradation the first control signal and to an identifier signal identifying the second source signal as representing a control variable that is any of substantially identical to and related to the control variable represented by the first source signal, by processing, with the process control component, the second source signal in lieu of the first source signal.

88. A method of operating a process control system according to claim 86, comprising the step of storing the identifier signal in a registry.

89. A method of operating a process control system according to claim 88, comprising the step of using the process control component to obtain the identifier signal from the registry.

90. A control system comprising a plurality of field devices, each generating a source signal representative of a control variable, an identifier signal identifying that control variable, and a confidence signal indicative of any of actual and potential degradation of that source signal, at least one block that processes a selected source signal and that responds to any of actual and potential degradation that source signal by (i) identifying from the identifier signals an alternate source signal, and (ii) processing that alternate source signal in lieu of the selected source signal, wherein the field devices and blocks are coupled by any of a bus, a network and other communications media.

91. A control system according to claim 90, wherein the block executes within a field device.

92. A control system according to claim 90, wherein the field devices comprise any of a flow sensor, pressure sensor, temperature sensor, level sensor, valve, recorder, positioner, other sensor, and other actuator.

93. A control system according to claim 90, wherein at least one field device is self-validating.

94. A control system according to claim 93, wherein the self-validating field device generates the confidence signal to be representative of any of a status of a value represented by the corresponding source signal and a status of that self-validating field device.

95. A control system according to claim 90, comprising one or more registries that store the identifier signals.

96. A control system according to claim 95, comprising a plurality of distributed registries.

97. A control system according to claim 90, wherein the communications media is operable in accord with any of a Foundation Fieldbus standard, a Profibus standard, a DeviceNet™ standard, an InterBus™ standard and a Modbus® standard.

98. A process control system comprising a plurality of field devices, each generating a source signal representative of a control variable, an identifier signal identifying that control variable, and a confidence signal indicative of any of actual and potential degradation of that source signal, wherein the field devices comprise any of flow sensors, pressure sensors, temperature sensors, level sensors, valves, recorders, positioners, other sensors and other actuators, one or more registries that store the identifier signals, at least one process control block that processes a selected source signal and that responds to any of actual and potential degradation that source signal by (i) identifying from the identifier signals an alternate source signal, and (ii) processing that alternate source signal in lieu of the selected source signal, wherein the field devices, registries and control blocks are coupled by a network comprising one or more buses operable in accord with any of a Foundation Fieldbus standard, a Profibus standard, a DeviceNet™ standard, an InterBus™ standard and a Modbus® standard.

99. A process control system according to claim 98, wherein any of a process control block and a registry are resident within a field device.

100. A process control system according to claim 98, wherein at least one field device is self-validating.

101. A process control system according to claim 98, wherein the self-validating field device generates the confidence signal to be representative of any of a status of a value represented by the corresponding source signal and a status of that self-validating field device.

102. A process control system according to claim 101, comprising plural registries that are distributed within the process control system.

103. A method of operating a control system comprising generating, with each field device in a set of plural field devices, a source signal representative of a control variable, an identifier signal identifying that control variable, and a confidence signal indicative of any of actual and potential degradation of that source signal, with at least one block, processing a selected source signal and responding to any of actual and potential degradation that source signal by (i) identifying from the identifier signals an alternate source signal, and (ii) processing that alternate source signal in lieu of the selected source signal, wherein the field devices and blocks are coupled by any of a bus, a network and other communications media.

104. A method of operating a control system according to claim 103, comprising executing the block within a field device.

105. A method of operating a control system according to claim 103, wherein the field devices comprise any of a flow sensor, pressure sensor, temperature sensor, level sensor, valve, recorder, positioner, other sensor and other actuator.

106. A method of operating a control system according to claim 103, wherein at least one field device is self-validating.

107. A method of operating a control system according to claim 106, comprising generating, with the self-validating field device, the confidence signal to be representative of any of a status of a value represented by the corresponding source signal and a status of that self-validating field device.

108. A method of operating a control system according to claim 103, comprising storing the identifier signals in one or more registries.

109. A method of operating a control system according to claim 103, comprising storing the identifier signal in plural registries that are distributed about the control system.

110. A method of operating a control system according to claim 103, comprising transferring information among the field devices and blocks with a communications media operable in accord with any of a Foundation Fieldbus standard, a Profibus standard, a DeviceNet™ standard, an InterBus™ standard and a Modbus® standard.

111. A method of operating a process control system comprising generating, with each field device in a set of plural field devices, a source signal representative of a control variable, an identifier signal identifying that control variable, and a confidence signal indicative of any of actual and potential degradation of that source signal, wherein the field devices comprise any of flow sensors, pressure sensors, temperature sensors, level sensors, valves, recorders, positioners, other sensors and other actuators, one or more registries that store the identifier signals, with at least one block, processing a selected source signal and responding to any of actual and potential degradation that source signal by (i) identifying from the identifier signals an alternate source signal, and (ii) processing that alternate source signal in lieu of the selected source signal, transferring information among the field devices, registries and control blocks via a communications medium comprising one or more buses operable in accord with any of a Foundation Fieldbus standard, a Profibus standard, a DeviceNet™ standard, an InterBus™ standard and a Modbus® standard.

112. A method of operating a process control system according to claim 111, comprising the step of executing a process control block within a field device.

113. A method of operating a process control system according to claim 111, wherein at least one field device is self-validating.

114. A method of operating a process control system according to claim 111, comprising generating, with the self-validating field device, the confidence signal to be representative of any of a status of a value represented by the corresponding source signal and a status of that self-validating field device.

115. A method of operating a process control system according to claim 114, comprising plural registries that are distributed within the process control system.

* * * * *

UNITED STATES PATENT AND TRADEMARK OFFICE
CERTIFICATE OF CORRECTION

PATENT NO. : 6,473,660 B1  
DATED : October 29, 2002  
INVENTOR(S) : Thibault

It is certified that error appears in the above-identified patent and that said Letters Patent is hereby corrected as shown below:

<u>Column 8,</u>  
Lines 18 and 59, insert the word -- of -- after "degradation"

<u>Column 9,</u>  
Line 8, insert the word -- a-- before "process"  
Line 14, insert the word -- of -- after "degradation"

<u>Column 10,</u>  
Lines 18 and 41, insert the word -- of -- after "degradation"

<u>Column 16,</u>  
Lines 12 and 54, insert the word -- of -- after "degradation"  
Lines 13 and 56, insert -- based on the relatedness of the represented control variable to that of the degraded source signal -- after "alternate source signal"

<u>Column 17,</u>  
Line 17, insert the word -- of -- after "degradation"

<u>Column 18,</u>  
Lines 18 and 21, insert -- based on the relatedness of the represented control variable to that of the degraded source signal -- after "alternate source signal"  
Line 20, insert the word -- of -- after "degradation"

Signed and Sealed this

Seventeenth Day of February, 2004

JON W. DUDAS  
*Acting Director of the United States Patent and Trademark Office*